(12) United States Patent
Pathak

(10) Patent No.: US 9,992,262 B2
(45) Date of Patent: Jun. 5, 2018

(54) PERSONALIZED DOCUMENT CONTENT AGGREGATION AND DOCUMENT ASSOCIATION IMPLEMENTED IN A DIGITAL RIGHTS MANAGEMENT SYSTEM

(71) Applicant: KONICA MINOLTA LABORATORY U.S.A., INC., San Mateo, CA (US)

(72) Inventor: Rabindra Pathak, San Jose, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 466 days.

(21) Appl. No.: 14/445,409

(22) Filed: Jul. 29, 2014

(65) Prior Publication Data

US 2016/0034427 A1 Feb. 4, 2016

(51) Int. Cl.
| | |
|---|---|
| *G06F 17/20* | (2006.01) |
| *H04L 29/08* | (2006.01) |
| *G06F 3/0484* | (2013.01) |
| *G06F 3/0481* | (2013.01) |
| *G06F 17/22* | (2006.01) |
| *G06F 21/10* | (2013.01) |
| *G06F 21/62* | (2013.01) |

(52) U.S. Cl.
CPC ............ *H04L 67/06* (2013.01); *G06F 3/0481* (2013.01); *G06F 3/04842* (2013.01); *G06F 17/2229* (2013.01); *G06F 17/2235* (2013.01); *G06F 21/10* (2013.01); *G06F 21/6218* (2013.01)

(58) Field of Classification Search
CPC ..... G06F 17/24; G06F 17/211; G06F 17/2247
See application file for complete search history.

(56) References Cited

U.S. PATENT DOCUMENTS

| | | | | |
|---|---|---|---|---|
| 6,006,332 A | * | 12/1999 | Rabne | G06F 21/10 705/51 |
| 8,447,747 B1 | * | 5/2013 | Yi | G06F 17/30867 707/705 |
| 2005/0246328 A1 | * | 11/2005 | Zhang | G06F 17/30867 |
| 2006/0047643 A1 | | 3/2006 | Chaman | |
| 2007/0130145 A1 | * | 6/2007 | Pedersen | G06F 17/30011 |

(Continued)

*Primary Examiner* — Keith Bloomquist
*Assistant Examiner* — Shahid Khan
(74) *Attorney, Agent, or Firm* — Chen Yoshimura LLP

(57) ABSTRACT

Methods for managing contents of multiple digital documents for individual users, to generate aggregated documents from multiple documents and/or create associations among multiple documents, based on the user's interactions with multiple digital documents. A document content aggregation method can, on a personalized basis, aggregate contents from multiple digital documents into an aggregated document based on a user's past interactions with the documents. The aggregation is based on a content importance score calculated from the user interaction pattern. A document association method can, on a personalized basis, create associations among multiple digital documents based on the user's past interactions with the documents. Two documents are deemed related if there is a user interaction pattern where the user interacts with both documents with a predetermined time interval from each other. When displaying one document, link icons are displayed to allow the user to directly navigate to the related documents.

7 Claims, 5 Drawing Sheets

(56) References Cited

U.S. PATENT DOCUMENTS

| | | | |
|---|---|---|---|
| 2008/0183870 A1* | 7/2008 | Singh | G06Q 20/20 |
| | | | 709/225 |
| 2009/0018996 A1 | 1/2009 | Hunt et al. | |
| 2009/0172021 A1* | 7/2009 | Kane | G06F 17/30873 |
| 2010/0115428 A1* | 5/2010 | Shuping | G06F 17/30905 |
| | | | 715/760 |
| 2012/0290926 A1* | 11/2012 | Kapadia | G06F 17/24 |
| | | | 715/255 |
| 2013/0080968 A1* | 3/2013 | Hanson | G06F 3/0482 |
| | | | 715/783 |

* cited by examiner

| Content index | Content Import- ance Score | # of annota- tions | # of prints | # of copy/ paste | # of edits | # of shares | # of views | # of naviga- tion to | # of naviga- tion from |
|---|---|---|---|---|---|---|---|---|---|
| 1 | | | | | | | | | |
| 2 | | | | | | | | | |
| 3 | | | | | | | | | |
| …… | | | | | | | | | |

| origination doc | origination page | destination doc | destination page | # of occurrence |
|---|---|---|---|---|
| beginner.pdf | m | expert.pdf | n | 1 |
| expert.pdf | o | medium.pdf | p | 1 |
| medium.pdf | q | expert.pdf | r | 1 |
| expert.pdf | s | beginner.pdf | t | 1 |
| … … | | | | |

PERSONALIZED DOCUMENT CONTENT AGGREGATION AND DOCUMENT ASSOCIATION IMPLEMENTED IN A DIGITAL RIGHTS MANAGEMENT SYSTEM

BACKGROUND OF THE INVENTION

Field of the Invention

This invention relates to personalized digital document management, and in particular, it relates to a method and related apparatus for generating aggregated documents from multiple documents, and creating associations among multiple documents, for individual users based on their interactions with multiple digital documents.

Description of Related Art

In a digital rights management system (DRM or RMS) for digital documents, the documents are registered on a rights management server (RMS server), along with associated rights management policies that define the users' access rights to the documents. Users' access to the documents is controlled by the RMS server. In one particular RMS system, each copy of a digital document, such as a PDF document, has metadata embedded in it that includes a license ID or document ID. When a user attempts to open such a document using a viewer application, such as Adobe Reader™, the viewer application contacts the RMS server; the RMS server determines, based on stored digital rights management information including the rights management policy associated with the document, whether the requesting user has access rights to the document. Based on a reply from the RMS server, the viewer application will open the document for viewing (or other actions such as printing, copying, etc.) by the user, or deny the access.

DRM systems are often used in educational settings where students study course materials which are digital documents managed by RMS servers. Typically a student will study several documents for a semester. Tools that help students (users) to conveniently organize and manage the study materials are desirable.

SUMMARY

Embodiments of the present invention provide methods for managing contents of multiple digital documents for individual users, to generate aggregated documents from multiple documents and/or create associations among multiple documents, based on the user's interactions with multiple digital documents.

A first embodiment of the present invention provides a document content aggregation method that can, on a personalized basis, aggregate contents from multiple digital documents into an aggregated document based on a user's (e.g. a student's) past interactions with the documents. This method can provide a new document that combines important content from different documents based on the user's historical document usage pattern. Such aggregated documents can be used, for example, by a student for a quick review of the study materials before a test.

A second embodiment of the present invention provides a document association method that can, on a personalized basis, create associations among multiple digital documents based on the user's past interactions with the documents. This effectively creates a package of documents; a student, for example, can navigate through the package and open associated documents. This can help avoid missing important document for study.

An object of the present invention is to create a more personalized reading experience of multiple digital documents for users.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a system comprising a server computer connected with a client computer for personalized display of a digital document by the client to a user, the method including: by the server computer: (a) receiving, from the client computer, user interaction information regarding interactions of the user with a plurality of documents, the interactions including one or more types of interactions selected from a group consisting of: opening a document, viewing a page of a document, making a note on a page of a document, printing a page of a document, modifying a page of a document, sharing a page of a document with others, copying or cutting content from a page of a document and pasting it in another document, navigating to a page of a document while viewing another document, and navigating from a page of a document to another document; (b) storing the user interaction information, including a time stamp of each user interaction, in association with a user ID of the user and document IDs of the documents; (c) generating, based on the stored user interaction information including the time stamps, document association information which indicates which documents are related to which documents; and (d) in response to a request from the client computer to open one of the plurality of documents, determining which other documents are related to the document to be opened, and transmitting to the client computer information identifying such related documents.

The method may further includes, by the client computer: (e) opening the document and displaying it in a display window; (f) transmitting the user interaction information to the server computer; (g) receiving from the server computer the information identifying one or more other documents that are related to the document; (h) displaying in the display window a link icon corresponding to each of the other document identified as being related to the document; and (i) in response to a user input which selects one of the link icons, displaying the other document corresponding to the selected link icons.

In another aspect, the present invention provides a method implemented on a client computer connected with a server computer for performing personalized display of a digital document to a user, including: (a) displaying the document in a display window; (b) transmitting, to the server computer, user interaction information regarding interactions of the user with the document, the interactions including one or more types of interactions selected from: opening a document, viewing a page of a document, making a note on a page of a document, printing a page of a document, modifying a page of a document, sharing a page of a document with others, copying or cutting content from a page of a document and pasting it in another document, navigating to a page of a document while viewing another document, and navigating from a page of a document to another document; (c) receiving from the server computer information identifying one or more other documents that are related to the document; (d) displaying in the display window a link icon corresponding to each of the other document identified as being related to the document; and (e) in response to a user input which selects one of the link icons, displaying the other document corresponding to the selected link icons.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
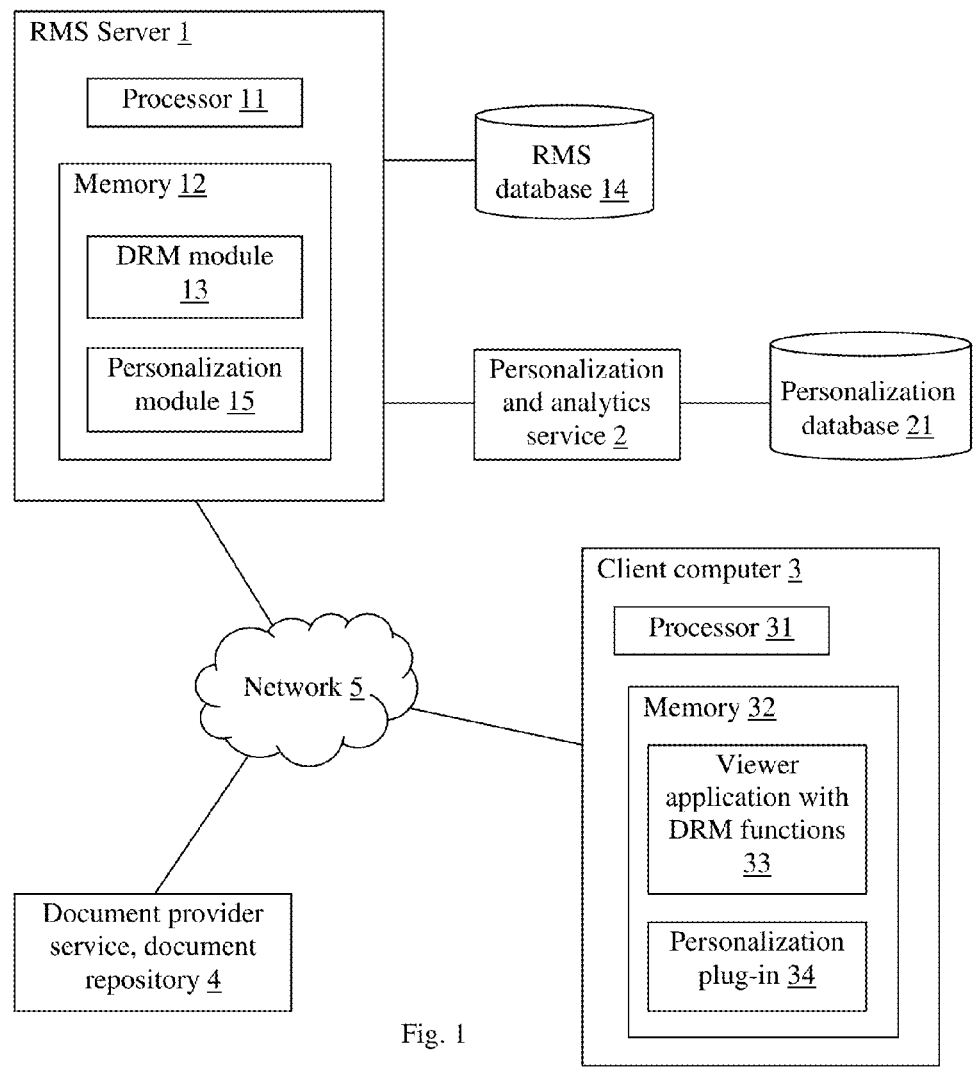
FIG. 1 is schematically illustrates a digital rights management system which implements various embodiments of the present invention.

Two embodiments are described in this disclosure: a document content aggregation method, which generates aggregated documents from multiple documents, and a document association method, which creates associations among multiple documents for convenient display to the user, both on a personalized basis for individual users based on his/her interactions with multiple digital documents that he/she accesses. The system architecture shown in FIG. 1 is useful in both embodiments.

Figures 5, 6:
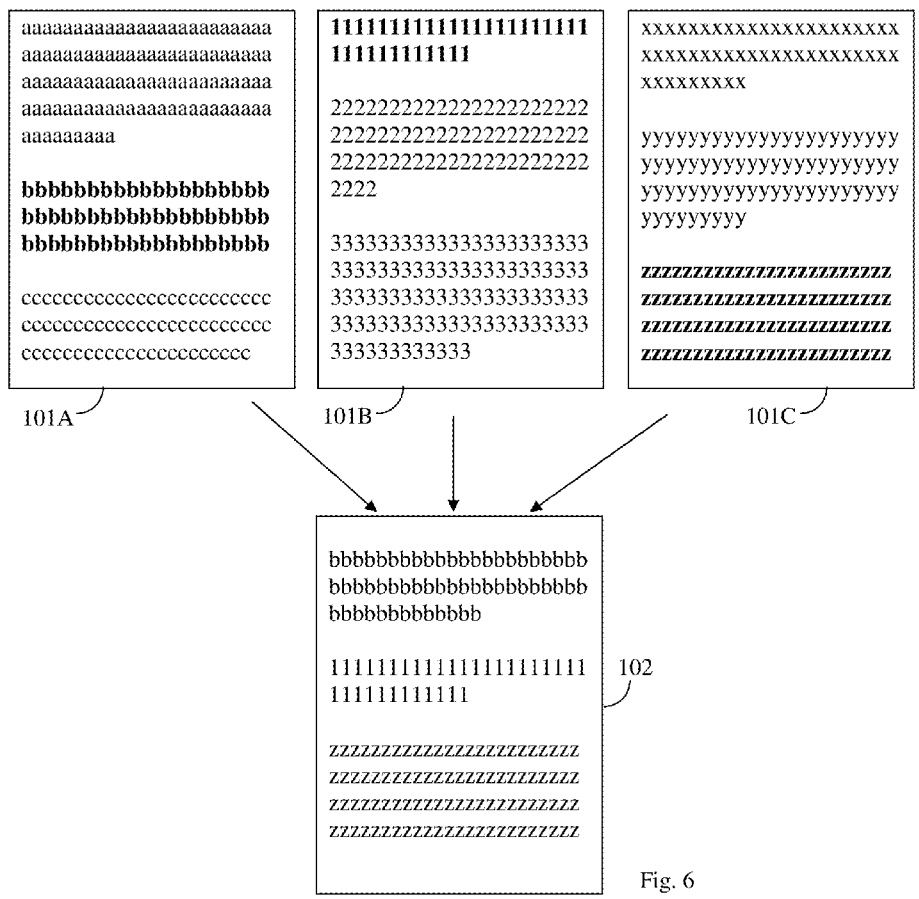
FIG. 5 schematically illustrates a table storing user interaction information and page ranking information according to the first embodiment.
FIG. 6 schematically depicts the effect of document content aggregation method of the first embodiment.

FIG. 6 schematically illustrates an exemplary result achieved by a document content aggregation method according to the first embodiment of the present invention. As shown in FIG. 6, based on the contents of various pages 101A, 101B, 101C etc. of various digital documents, which the user have interacted with, such as viewed, edited, copied, annotated, etc., an aggregated document 102 is created. The source pages 101A, 101B, 101C etc. shown in FIG. 6 may be pages of one or multiple documents. In the illustrated example, the paragraph "bbb . . . " from page 101A, the paragraph "111 . . . " from page 101B, the paragraph "zzz . . . " from page 101C are selected and copied into the aggregated document 102 (which can have multiple pages). In addition, embedded links are provided for the copied content, which link to the location in the source documents where the content is copied from, so that the user can click on the copied text in the aggregated document and the corresponding source document will open at the location of that content.

The example shown in FIG. 6 is paragraph based, i.e., individual paragraphs are selected from the source pages and aggregated together in the aggregated document. The aggregation may also be page based, i.e., individual pages of source documents are selected and aggregated together in the aggregated document. In addition or alternatively, the aggregation may be section based, chapter based, etc. In this disclosure, the term "content" can refer to a unit of the document such as a paragraph, a page, a section, etc.

In the document aggregation method, the selection of contents in the source documents is based on the particular user's past interactions with the documents. Therefore, the content aggregation is personalized for each user. This method allows users, e.g., students, to consolidate important contents of multiple documents into one document. This way, student can use one document for a quick review before test rather than reading all the different documents.

FIG. 1 schematically illustrates a system which implements the personalized document content aggregation method according to the first embodiment of the present invention. The system includes a server computer 1 (an RMS server in this example), a personalization service 2 connected to the server 1, and a client computer 3 connected to the server via a network 5 such as the Internet. The general structures of the server computer 1 and the client computer 3 include respective processors 11 and 31 and respective memories 12 and 32 storing programs executed by the respective processors to perform various functions described in more detail below. The personalization service 2 may be implemented on another server computer separate from the RMS server (in the configuration shown in FIG. 1) or as a program module running on the RMS server 1.

The server 1 has a digital rights management (DRM) program module 13 which performs DRM functions, such as those described in the Background section above, and an RMS database 14 including information relevant for the DRM functions, such as rights management policies, a registered user database, a document database that associate each document ID with a policy ID, etc. The server 1 also includes a personalization module 15 which communicates with the personalization service 2 to perform various functions related to document content aggregation and document association as will be described in more detail later. The personalization service 2 maintains a personalization database 21 storing information related to user interactions with documents as will be described in more detail later. When the personalization service 2 is a part of the RMS server 1, the RMS database 14 and the personalization database 21 may be stored in the same storage device.

The RMS system also includes a document provider service and a document repository 4, which may be implemented by servers and storage devices in any suitable configuration. The document provider service cooperates with the server 1 to generate DRM protected documents, and provides DRM protected documents to users (client computers 3).

When a user of the client computer 3 attempts to open a DRM protected document, for example by using a viewer application 33, the viewer application cooperates with the RMS server 1 to determine whether the user is permitted to access the document. In this process, the viewer application transmits to the RMS server the user ID of the user and the document ID of the document to be accessed, and the server 1 determines whether the user is permitted access and transmits a reply to the viewer application. Because the RMS server has the user ID and document ID, it can store information of the user's interaction with the document in association with the user ID and document ID, and that information can be used to generate aggregated document(s) on a personalized basis for the user.

Figure 2:
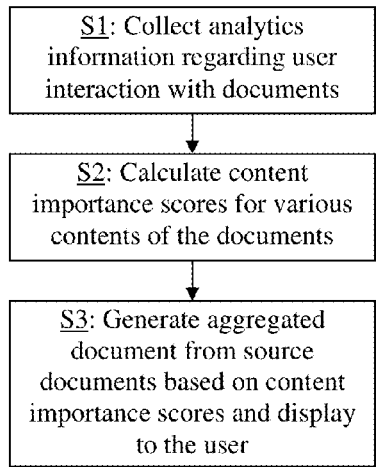
FIG. 2-4 schematically illustrate a document content aggregation method according to a first embodiment of the present invention.

As shown in FIG. 2, the document content aggregation method according to the first embodiment of the present invention includes three main processes: First (step S1), collecting and storing information regarding user interactions with documents; second (step S2), calculating content importance scores for various contents of various documents based on the collected user interaction information; and third (step S3), based on the content importance scores, generating aggregated document(s) for display to the user on the client computer. Step S1 is performed, by the client and the server in collaboration with each other, at the time the user views and interacts with each document. Steps S2 and S3 are performed, again by the client and the server in collaboration with each other, in response to a request by the user to generate an aggregated document (e.g., a student user may make such a request at the end of a semester when he prepares for exam). These processes are described in more detail with reference to FIGS. 3-4.

Figure 3:
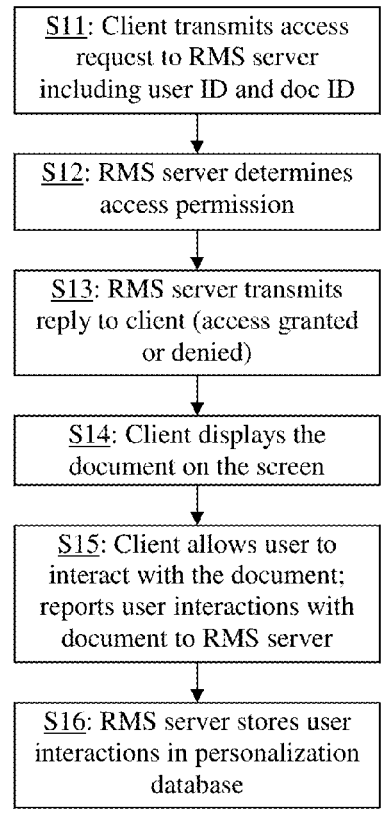
Figure 4:
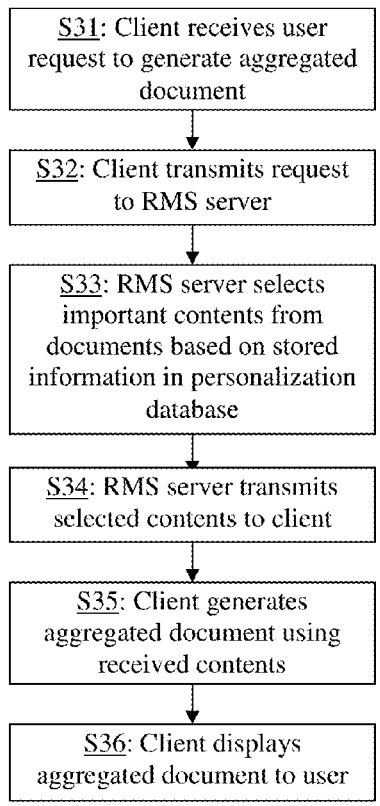

FIG. 3 schematically illustrates the collecting and storing of information regarding user interactions with documents (step S1). As shown in FIG. 3, when the user attempts to access a document on the client computer 3, such as by attempting to open it with the viewer application 33, the client computer transmits an access request to the server which includes the user ID of the user and the document ID (or license ID) of the document (step S11). Based on the user ID and document ID (or license ID), the server determines whether access should be granted by referring to the information stored in the RMS database 14 (step S12). The server transmits a reply to the client to indicate whether access permission is granted or denied (step S13), and if the permission is granted, the client opens the document and displays it on the screen of the client (step S14).

Then, during the user's viewing session of the document, the user interacts with the document through the viewer application, and the client reports to the RMS server information regarding the user's interactions with the document (step S15). The types of user interactions (events) reported to the RMS server include: viewing a content of the document (i.e. navigating to a page), making a note (annotation) relative to a content, printing a page, modifying a content (saving changes), sharing a content with others (using email or other types of messages), copying or cutting content from a source document and pasting it in another document, navigating to a content of a document while viewing another document, navigating from a content to another document, etc. The personalization module 15 of the RMS server 1 forwards the user interaction information to the personalization service 2, and the personalization service 2 records it in the personalization database 21 in association with the user ID and document ID (step S16).

As mentioned earlier, the term "content" can mean a paragraph, a page, a section, etc. of a document. Some of the above-mentioned user actions typically can only be associated with pages but not paragraphs or sections of the documents; examples include printing (print drivers typically allows for page range selection), and navigating in a document using the page up/down and "go to page" tools of the viewer application. Other user actions, such as annotation, editing, sharing, copying and pasting, navigating to/from a specific location, etc. can be associated with a paragraph, a page, a section or chapter, and/or other units of contents. When the client 3 reports the user interactions to the server 1, it preferably reports as much specificity as available. For example, when reporting an annotation, the specific location of the annotation is reported, not just the page where the annotation occurs.

In the personalization database 21, with respect to each user, the user interaction history data is stored for each unit of content of each document that the user has interacted with. FIG. 5 schematically illustrates an example of a table storing the data regarding various types of user interactions (e.g. the number of times each type of interaction is performed).

In the calculation process (step S2), the personalization service 2 analyzes the user interaction history information in the personalization database 21 to generate the content importance scores which can be used to select contents for aggregation. The importance score for each unit of content (a paragraph, a page, etc.) may be calculated as a weighted sum of multiple types of user interactions, such as the ones listed above in connection with step S15. The weighted sum can be expressed as:

$$\text{Content Importance Score } S(u) = \Sigma_i W_i * N_i(u)$$

where u is an index or other identifying information that identifies a unit of content (e.g. paragraph number, page number, section number, page number plus line number, etc.), i is an index of the type of user interactions, $W_i$ are the weights given to the types of user interactions, and $N_i(u)$ are the cumulative number of times the user performed that type of interaction for that unit of content. Any suitable weights may be given to the various types of user interactions. In one particular example, the following types of user interactions are used to calculate the content importance score and they are given declining weights in the this order: annotation, print, copy or cut and paste, edit, share, and view. The content importance score represents the level of interest the user has in a given content. The content importance score for each unit of content of a document may be stored in the personalization database 21 along with the user interaction history data, as shown in the example of FIG. 5.

The calculation (step S2) may be performed dynamically when the user interacts with each document, i.e., each time a user interaction report is received from the client, the user interaction history data in the table of FIG. 5 is updated and the content importance score for the affected content unit is re-calculated. Alternatively, the user interaction reports received from the client during a viewing session are continuously recorded, and the calculation in step S2 is performed once after the user closes the document. As another alternative, the user interaction reports received from the client during a viewing session are continuously recorded, and the content importance score for each content unit is calculated only after the user requested the aggregated document to be generated (i.e. after step S31 in FIG. 3).

Preferably, the document content aggregation method allows the user to group documents for the purpose of generating aggregated documents. In other words, the user can specify a list of documents from which contents will be selected and aggregated into one aggregated document. This is useful, for example, for students who can group all documents for a particular course of study as one group in order to generate one aggregated document for that course.

FIG. 3 schematically illustrates the process of generating an aggregated document (step S3). The process starts when the student requests an aggregated document to be generated (step S31). Preferably, the request identifies a group of documents that are to be aggregated. The group can be identified in various ways. For example, the client 3 can prompt the user to enter a list of documents IDs. Alternatively, the user can assign a course ID or subject area ID to each document (this assignment can be done beforehand, e.g. when the student first opens each document), and then identifies a course ID or subject area ID in the request of step S31. As another alternative, each document may be pre-associated with a course ID by the creator of the document such as a course instructor, and the user can enter the course ID when requesting an aggregated document to be generated.

The client 3 transmits the request to the RMS server 1, along with the user ID of the user (step S32). The personalization service 2 then analyzes the user interaction history information for that user, which has been stored in the personalization database 21, to select the important contents from among the documents identified by the request (step S33). If the calculation of the content importance scores (step S2) is not already performed, then step S33 will include this calculation step. A selection threshold may be set beforehand for content selection. In one example, the threshold is a maximum page limit of the aggregated document, so that the most important contents are selected until the page limit is reached. Alternatively, the selection threshold may be a minimum content important score, so that all contents have a higher score than the threshold will be selected.

The RMS server 1 transmits the selected important contents to the client 3 (step S34), and the client generates the aggregated document from the received contents (step S35) and displays it to the user (step S36). Alternatively, instead of steps S34 and S35, the personalization service 2 may generate the aggregated document from the selected contents and transmit the aggregated document to the client via the RMS server 1.

Optionally, the aggregated document may be saved by the RMS server 1 as a DRM protected document, which the user can access in the same way as other DRM protected documents.

On the client 3, the function of reporting user interaction to the server 1 and the function of generating and displaying aggregated documents can be implemented by a personalization plug-in or utility program 34. As advantage of using a plug-in or utility program is that the viewer application 33, which is typically a program already installed on the client 3, does not need to be modified; the plug-in or utility program can be separately loaded onto the client 3. Likewise, as mentioned earlier, the personalization module 15 may be installed on the RMS server 1 as an add-on module, with the similar advantage that the DRM module 13 on the server does not need to be modified.

The plug-in 34 on the client 3 can be enhanced to support additional user actions. For example, the client plug-in 34 may implement a function to allow the user to manually assign a content importance score to a content of the document, which will override the content importance score calculated by the personalization service 2 based on stored user interaction history information.

The second embodiment of the present invention provides a document association method that can, on a personalized basis, create associations among multiple digital documents based on the user's past interactions with the documents. This is accomplished by providing links from one document (referred to as the origination document) to an associated document (referred to as the destination document). The link may be displayed as an icon in the display window of the origination document, as well as an icon in the display window of the destination document. An example is shown in FIG. 7.

Figures 7, 11:
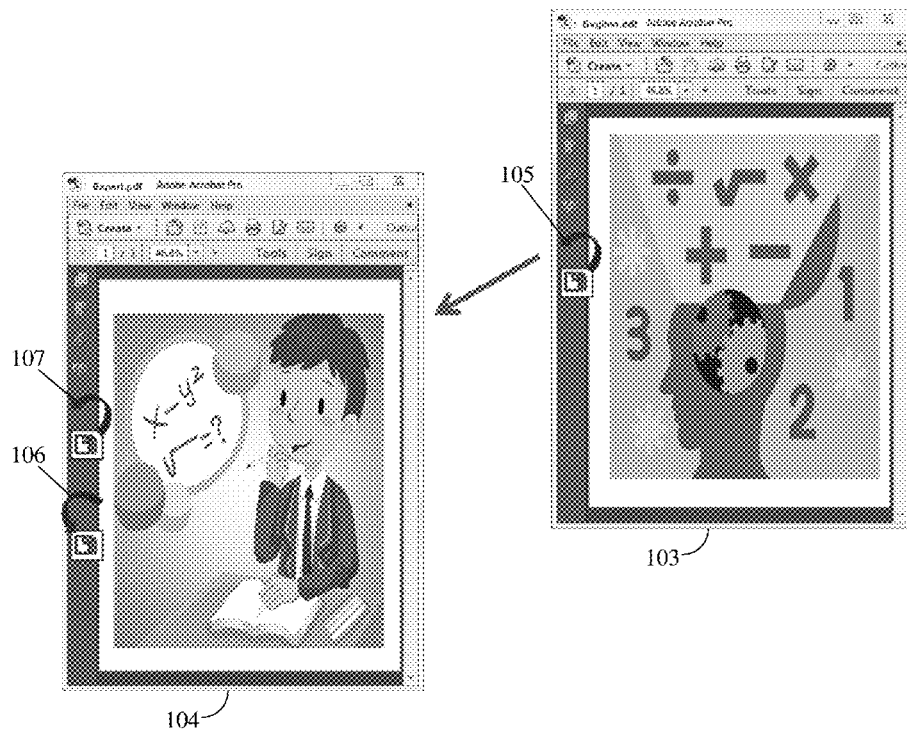
FIG. 7 schematically depicts the effect of document association according to a second embodiment of the present invention.
FIG. 11 schematically illustrates an example of stored user navigation information for a variation of the second embodiment.

In FIG. 7, a document 103 is shown to have a destination (or "link to") icon 105. When the user is viewing the document 103 and clicks the destination icon 105, a related document 104 is displayed. Relative to each other, the document 103 is the origination document and document 104 is the destination document. The destination document 104 is preferably displayed in a separate window without closing the window of the origination document 103. Alternatively, the destination document 104 can be displayed in the same window where the origination document was displayed, i.e., it replaces the origination document in that window. As shown in FIG. 7, the destination document 104 has an origination (or "link from") icon 106 which links the document 104 (as a destination) to the origination document 103. Thus, when the user is viewing the document 104, the user can click on the origination icon 106, and the origination document 103 will be displayed. The example in FIG. 7 also shows the document 104 as having a destination icon 107, which links the document 104 (as an origination document) to another document (not shown in FIG. 7) as a destination document.

Optionally, the destination and origination icons may be implemented such that when the mouse pointer hovers over the icon, relevant information, such as the document name of the destination or origination document, is displayed in a small popup window.

The association of different documents, i.e. the "link to" and "link from" relationship, is generated based on the history of the user's interactions with the various documents. When a first document is an origination document relative to a second document (the destination document), it indicates that the user has in the past navigated to the destination document while viewing and interacting with the origination document. In one example, if the second document is opened within a predefined time interval T after the last interaction event the user performed on the first document, the second document has a possible association with the first document. In another example, if the user performs an interaction on the second document within the predefined time interval T after the last interaction event the user performed on the first document, the second document has a possible association with the first document. If these user interaction patterns are repeated sufficient times, then the relation is confirmed. For this purpose, the user interaction events on all documents are recorded with time stamps. Here, the user interaction events include opening the document, as well as those listed in the first embodiment, such as viewing the document (e.g. a navigation event within the document), making an annotation, printing, modifying (saving changes), sharing with others (e.g. using email or other types of messages), copying or cutting from a document and pasting it in another document, navigating to the document while viewing another document, navigating from the document to another document, etc.

Having two different shaped icons for "link to" and "link from" gives an idea to the user about which document was visited immediately before and after the current document. Over periods of time, this will give accurate information to the user about the order in which he needs to read the related documents.

In an alternative implementation, two documents can be deemed to be related to each other without one document being designated the origination document and the other the destination document. Two documents can be deemed related if there is a pattern of the user interacting with both documents within a predefined time interval T. Correspondingly, a simple link icon (no differentiation between "link to" and "link from") can be displayed in both documents to indicate that a related document exists. Using this alternative implementation, in the example of FIG. 7, both icon 105 and icon 106 would be replaced by the same link icon.

The document association method of the second embodiment can be implemented using the same system configuration shown in FIG. 1. The personalization service 2, the personalization module 15 of the server 1, and the personalization plug-in 34 on the client 3 cooperate with each other to carry out the various method steps of this embodiment.

Figure 8:
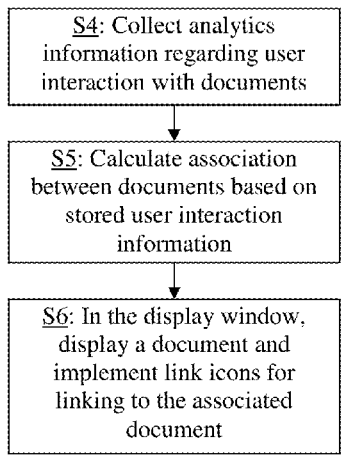
FIGS. 8-10 schematically illustrate a document association method according to the second embodiment.

As shown in FIG. 8, the document association method according to the second embodiment includes three main processes: First (step S4), collecting and storing information regarding user interactions with documents; second (step S5), calculating document associations based on the collected user interaction information; and third (step S6), when displaying a document in the viewer application on the client computer, displaying icons to indicate association with other documents, and using the icons to navigate to the associated documents. These processes are explained in more detail with reference to FIGS. 3, 9 and 10.

The collecting and storing of information regarding user interactions with documents (step S4) is similar to step S1 of the first embodiment, which has been described in detail earlier with reference to FIG. 3. Here, it should be noted that the process is performed for multiple documents, so that user interactions with multiple document can be recorded. Further, as mentioned earlier, the types of user interactions recorded by the RMS server includes the document open event, in addition to the other events listed in the first embodiment. Moreover, in addition to the types of user interactions, the time stamp of each user interaction event is reported by the client and recorded by the server.

Figure 9:
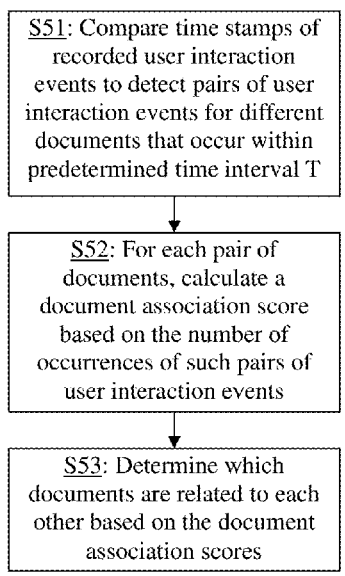

In the calculation process (step S5), shown in more detail in FIG. 9, the personalization service 2 analyzes the user interaction information in the personalization database 21 to calculate associations between documents. As shown in FIG. 9, the time stamps of the recorded user interaction events are compared to determine whether user interaction events for two different documents occur within the predetermined time interval T (step S51). The number of times of such occurrence for each pair of documents is calculated as a document association score (step S52) which can be used to evaluate whether the pair of documents are related.

In a first implementation, the sequence of the two user interaction evens that occur within the time interval T is disregarded; the total number of times that two user interaction events in the two documents occur within the time interval T is calculated as the document association score between the two documents. For this implementation, two documents may be deemed related without designation of which one is the origination document and which one is the destination document. In a second implementation, the sequence of the two user interaction evens that occur within the time interval T is taken into account. If the user interaction event in the first document occurs before the user interaction event in the second document occurs, this pair of user interaction events will contribute to a "first document to second document" association score, i.e. the score for the association where the first document is the origination and the second document is the destination. The reverse sequence of user interaction events will contribute to the "second document to first document" association score. Under the second implementation, it is possible for two documents to be related in both directions.

Once the pair-wise document association scores are calculated, pairs of documents that have a document association score above a threshold value are deemed to be related (step S53). The threshold value may be fixed, or manually or automatically adjustable. For example, if there are many pairs of documents having high document association scores, the threshold value may be made higher to avoid creating too many associations which could be overwhelming to the user.

The calculation (step S5) may be performed dynamically, i.e., each time a user interaction report is received from the client, its time stamp is compared to the time stamps of user interaction events in other documents to determine whether any document association score is to be updated. Alternatively, the user interaction reports received from the client during a viewing session for a document are recorded, and the calculations in step S5 are performed once after the user closes the document, to update the document association scores between that document and other documents. In another alternative, the calculations in step S5 are performed when the user requests to open a document, so that the document association scores between that document and other documents are updated and the link icons can be properly displayed when the document is open.

The document association information, i.e. information that indicates which documents are related to which documents, is stored in the personalization database 21. This information can be stored in a number of forms. For example, it can be in the form of a matrix, where each column and each row corresponds to a document, and each cell stores a document association score. Each cell may alternatively store a binary value indicating "related" or "not related". Or, the document association information can be stored in the form of a document ID list for each document, to identify other documents that are related to that document. If the document associations differentiate between origination and destination documents, then the list of document IDs will include a list of origination documents and a list of destination documents relative to that document.

Figure 10:
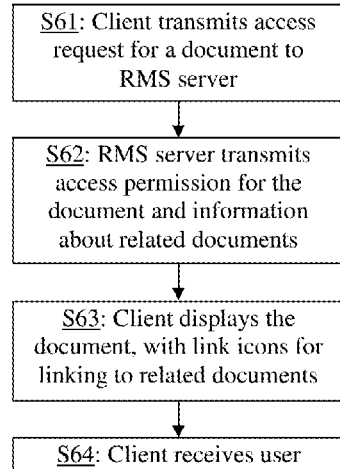
Figure 10:
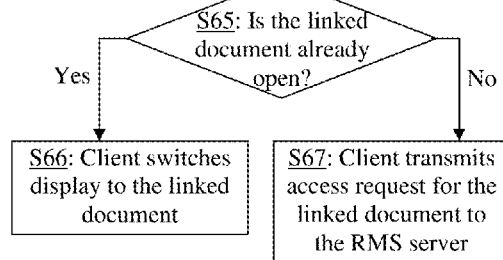

The display of the link icons (step S6) is accomplished by the client 3 and the server 1 which cooperate with each other. As shown in FIG. 10, when the client 3 transmits an access request to the RMS server to open a document (step S61), the RMS server 1 transmits an access permission to the client if the server determines that access permission should be granted (step S62). In addition, the personalization service 2 retrieves the relevant document association information from the personalization database 21; based on that information, the personalization service 2 transmits to the client (via the server 1) a list of document IDs of all documents deemed to be related to the document being opened (including origination and destination documents if they are differentiated) (step S62).

The client 3 displays the document, with the link icons indicating the related documents (refer to FIG. 7) (step S63). The link icons may be "link to" or "link from" icons, or simple link icons that do not indicate which document is origination and which is destination. Then, when the user views the document, the user may click on a link icon (step S64). In response, the client determines whether the document pointed to by the link icon is already open on the client or not (step S65). If it is already open, the client switches to the display of the linked document (step S66). For example, the linked document may already be open in another window on the client's display screen, in which case the client will make that window the active window for the user to interact with. If the document pointed to by the link icon is not already open on the client, the client transmits an access request to the RMS server 1 to open the document (step S67). Step S67 is done automatically by the client 3 without the user performing the normally required steps of opening a document. Step S67 initiates a normal document open process, and the RMS server 1 and the client 3 process the document open request in a normal manner, e.g., as shown in steps S12 to S14 in FIG. 3. Once that document is open, the client allows the user to interact with the newly opened document and reports the user interaction to the server to be stored (see FIG. 3, steps S15 to S16).

Although specific examples are depicted in FIG. 6, the link icons are not limited to these examples. The link icons and its navigation effect of the links can be implemented using well known programming techniques.

In the above descriptions, the processes of collecting user interaction information (step S4) and displaying the document with the link icons (step S6) are explained separately with reference to FIGS. 3 and 9. In practice, these two processes may occur concurrently during a document viewing session. In other words, each time the user opens the document, the document association information is transmitted by the personalization service 2 to the client 3, and the client can implement the link icons when displaying the document (steps S62 to S67). In the mean time, during the viewing session, the client 3 also reports user interactions with the document to the personalization service 2 (steps S15 of FIG. 3).

On the client 3, the function of reporting user interaction to the server 1 and the function of implementing the link icons can be implemented by the plug-in module 34 of the viewer application 33. As advantage of using a plug-in is that the viewer application 33, which is typically a program already installed on the client 3, does not need to be modified; the plug-in program can be separately loaded onto the client 3. Likewise, the personalization module 15 may be installed on RMS server 1 as an add-on module, with the similar advantage that the DRM module on the server does not need to be modified.

An optional feature of the second embodiment is to establish the association between specific pages of various documents, not just between documents. To accomplish this, the user's interactions with the documents are recorded with specific page information. An example is shown in FIG. 11. For example, the first line of FIG. 11 records occurrences where the user first interacted with page m of document beginner.pdf, and then within the predetermined time interval T, interacted with page n of document expert.pdf. The last column indicates the number of occurrence of such a pair of user interactions. The number of occurrences can be used as a score to determine whether page m of document beginner.pdf and page n of document expert.pdf are related to each other as origination and destination locations. If these two pages are related, a "link to" icon may be displayed on the origination page of the origination document which will link to the destination page of the destination document, and a "link from" icon may be displayed on the destination page of the destination document which will link to the origination page of the origination document. Again, the two link icons may alternatively be the same "link" icons without differentiating origination and destination. Clicking on a link icon will open the associated document at the relevant page. As an alternative, instead of displaying the link icon only on the related pages, the icons can be displayed on per document basis, i.e., displayed in a location of the display window so that it is visible regardless of which page the user is currently viewing. Once the user clicks on the icon, the related document will be opened and related page will be displayed.

Referring back to FIG. 1, the document content aggregation method of the first embodiment and the document association method of the second embodiment described above rely on the cooperation of the client 3 (e.g. via the personalization plug-in 34) and the server 1 (e.g. via the personalization module 15 and the personalization service 2), which communicate with each other via the network 5. In alternative embodiments, the document content aggregation method and the document association method may be implemented in an offline mode, where the user interaction information is stored on the client 3. The client analyzes the user interaction information to generate the content importance scores and the document association scores, and generates the aggregated document or implements the link icons based on such analysis.

Also, although the document content aggregation method and the document association method described above are implemented in conjunction with a DRM system, the methods can also be implemented separately from a DRM system. In other words, the server 1 does not have to perform the DRM function of controlling access to documents.

It will be apparent to those skilled in the art that various modification and variations can be made in the document display personalization method and related apparatus of the present invention without departing from the spirit or scope of the invention. Thus, it is intended that the present invention cover modifications and variations that come within the scope of the appended claims and their equivalents.

What is claimed is:

1. A method implemented in a system comprising a server computer connected with a client computer for personalized display of digital documents by the client to a user, the method comprising:

by the server computer:

(a) receiving, from the client computer, user interaction information regarding interactions of the user with a plurality of documents, the interactions including one or more types of interactions selected from a group consisting of: opening a document, viewing a page of a document, making a note on a page of a document, printing a page of a document, modifying a page of a document, sharing a page of a document with others, copying or cutting content from a page of a document and pasting it in another document, navigating to a page of a document while viewing another document, and navigating from a page of a document to another document;

(b) storing the user interaction information, including a time stamp of each user interaction, in association with a user ID of the user and document IDs of the documents;

(c) generating, based on the stored user interaction information including the time stamps, document association information which indicates which ones of the plurality of documents are related to which ones of the plurality of documents; and (d) in response to a request from the client computer to open one of the plurality of documents, determining which other documents are related to the document to be opened, and transmitting to the client computer information identifying such related documents, wherein step (c) includes:
comparing the time stamps of the stored user interactions to detect pairs of user interactions for different documents that occur within a predetermined time interval; and
for each one of the plurality of documents, and relative to each of the other ones of the plurality of documents:
calculating a first document association score which represents a number of detected pairs of user interactions that occurred in the one and the other documents within the predetermined time interval where the user interaction in the one document occurred before the user interaction in the other document;
calculating a second document association score which represents a number of detected pairs of user interactions that occurred in the one and the other documents within the predetermined time interval where the user interaction in the one document occurred after the user interaction in the other document;
if the first document association score is above a predetermined threshold, determining the one document to be related to the other document with the one document being an origination document and the other document being a destination document; and
if the second document association score is above a predetermined threshold, determining the one document to be related to the other document with the one document being a destination document and the other document being an origination document.

2. The method of claim 1, wherein step (c) includes:
comparing the time stamps of the stored user interactions to detect pairs of user interactions for different documents that occur within a predetermined time interval;
for each one of the plurality of documents, and relative to each of the other ones of the plurality of documents, calculating a document association score which represents a number of detected pairs of user interactions that occurred in the one and the other documents within the predetermined time interval; and
determining which ones of the plurality of documents are related to which other one of the plurality of documents based on the document association scores.

3. The method of claim 1, wherein step (d) further determines which pages of which other ones of the plurality of documents are related to particular pages of the document to be opened, and further transmits to the client computer information identifying the related pages of the related documents.

4. The method of claim 1, further comprising:
by the client computer:
(e) opening the document and displaying it in a display window;
(f) transmitting the user interaction information to the server computer;
(g) receiving from the server computer the information identifying one or more other documents that are related to the document;
(h) displaying in the display window a link icon corresponding to each of the other one or more documents identified as being related to the document; and
(i) in response to a user input which selects one of the link icons, displaying the other document corresponding to the selected link icons.

5. The method of claim 4, wherein the link icon is either a link to icon which indicates that the other document is a destination relative to the document or a link from icon which indicates that the other document is an origination relative to the document.

6. A method implemented in a system comprising a server computer connected with a client computer for personalized display of digital documents by the client to a user, the method comprising:
by the server computer:
(a) receiving, from the client computer, user interaction information regarding interactions of the user with a plurality of documents which are PDF (Portable Document Format) documents, the interactions including one or more types of interactions selected from a group consisting of: opening a document, viewing a page of a document, making a note on a page of a document, printing a page of a document, modifying a page of a document, sharing a page of a document with others, copying or cutting content from a page of a document and pasting it in another document, navigating to a page of a document while viewing another document, and navigating from a page of a document to another document;
(b) storing the user interaction information, including a time stamp of each user interaction, in association with a user ID of the user and document IDs of the documents;
(c) generating, based on the stored user interaction information including the time stamps, document association information which indicates which ones of the plurality of documents are related to which ones of the plurality of documents; and
(d) in response to a request from the client computer to open one of the plurality of documents, determining which other documents are related to the document to be opened, determining which pages of which ones of the plurality of other documents are related to particular pages of the document to be opened, and transmitting to the client computer information identifying such related documents and information identifying the related pages of the related documents;
by the client computer:
(e) opening the document and displaying it in a display window;
(f) transmitting the user interaction information to the server computer;
(g) receiving from the server computer the information identifying one or more other documents that are related to the document and the information identifying the related pages of the related documents;
(h) displaying in the display window a link icon corresponding to each of the other one or more documents identified as being related to the document; and
(i) in response to a user input which selects one of the link icons, displaying the related page of the other document corresponding to the selected link icon.

7. A method implemented on a server computer in a system comprising the server computer connected with a client computer, the method comprising:
(a) receiving, from the client computer, user interaction information regarding interactions of the user with a plurality of documents which are PDF (Portable Document Format) documents, the interactions including one or more types of interactions selected from a group consisting of: opening a document, viewing a page of a document, making a note on a page of a document, printing a page of a document, modifying a page of a document, sharing a page of a document with others, copying or cutting content from a page of a document and pasting it in another document, navigating to a page of a document while viewing another document, and navigating from a page of a document to another document;

(b) storing the user interaction information, including a time stamp of each user interaction, in association with a user ID of the user and document IDs of the documents;

(c) generating, based on the stored user interaction information including the time stamps, document association information which indicates which ones of the plurality of documents are related to which ones of the plurality of documents; and (d) in response to a request from the client computer to open one of the plurality of documents, determining which other documents are related to the document to be opened, determining which pages of which ones of the plurality of other documents are related to particular pages of the document to be opened, and transmitting to the client computer information identifying such related documents and information identifying the related pages of the related documents.

\* \* \* \* \*